Dec. 20, 1927.  1,653,565
W. F. HEINEMAN
METHOD OF BUTT WELDING BY MEANS OF AN ELECTRIC ARC
Filed Aug. 13, 1926
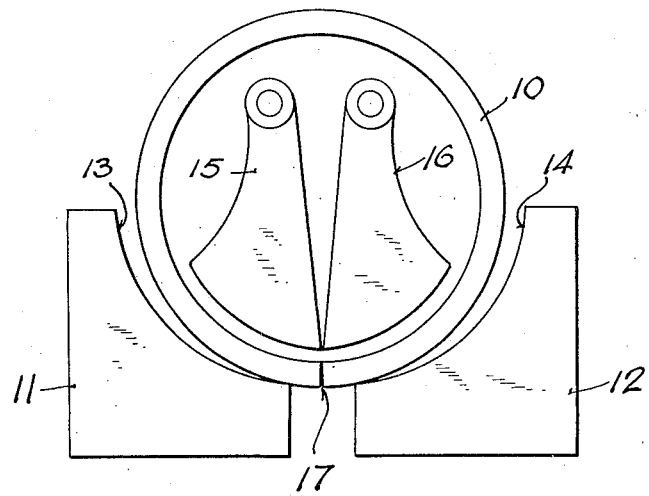
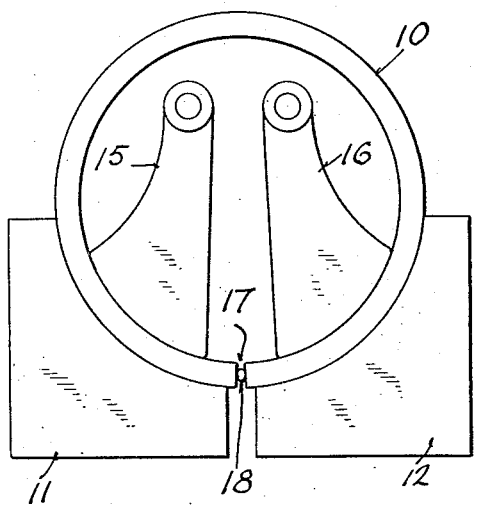 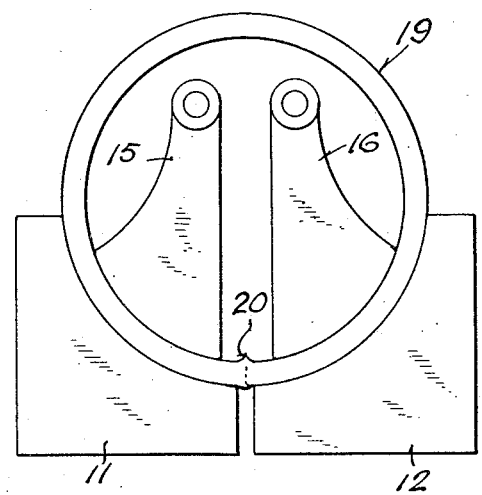
WITNESS:
Fred Palm
DEL.
INVENTOR.
WARREN F. HEINEMAN
BY
Erwin, Wheeler & Haaland
ATTORNEYS.

Patented Dec. 20, 1927.

1,653,565

UNITED STATES PATENT OFFICE.

WARREN F. HEINEMAN, OF SHOREWOOD, WISCONSIN, ASSIGNOR TO A. O. SMITH CORPORATION, OF MILWAUKEE, WISCONSIN, A CORPORATION OF NEW YORK.

METHOD OF BUTT WELDING BY MEANS OF AN ELECTRIC ARC.

Application filed August 13, 1926. Serial No. 128,949.

My invention relates to welding metals by electricity, in the practical operation of which the edges or surfaces of the parts to be welded are connected to the poles of the source of energy. It consists in the arrangement of a conducting element constituting a high resistance between such edges or surfaces, whereby the adjacent regions of the parts to be welded are pre-heated in a degree which will greatly expedite the welding operation, so that large areas may be successfully welded by an electrical current of comparatively low voltage, with a consequent economy in the cost of production.

The conducting element of high resistance is so disposed with relation to the parts to be welded, that when the temperature of the said element has risen to the point of fluidity, the molten metal thereof will flow away from the joint, leaving a gap which is instantly crossed by an arc, which latter is maintained until the edges or surfaces of the parts to be welded are brought to a suitable state of fusion. Such fused edges or surfaces are then pressed together to form the butt-welded joint.

The invention will now be particularly described in connection with the illustration herewith, and the novelty of the process will be pointed out in the appended claims.

In the accompanying drawing:

Figure 1 is a view in side elevation of a conventional machine arranged for butt-welding short, tubular sections, such as pipe couplings.

Fig. 2 is a like view of the same machine, with the parts as positioned at the instant that the current is applied, Fig. 3 is a like view showing the parts as at the conclusion of the welding operation.

Fig. 4 is a perspective view of a section of the resistance element, showing the latter in its preferred cross sectional form.

In the drawing, the numeral 10, indicates a pipe coupling blank of circular form produced from a thick metal slab or plate, with its ends abutting or substantially abutting in the circle of the coupling. Electrodes 11 and 12 of copper or other metal of free conductivity, hollowed out or recessed on their opposed faces as at 13 and 14 to conform to the periphery of the coupling, are mounted so as to have a movement toward and from each other, and so receive and hold the coupling blank 10 between them.

Pivoted clamps 15 and 16, are arranged to operate within the coupling blank, and have a movement away from each other, so as to engage the coupling blank on opposite sides of the break 17, formed at the meeting ends of the slab or plate, and act to clamp the coupling blank firmly in the recesses in the electrodes 11 and 12. With the electrodes separated, and the clamps retracted toward each other, as shown in Fig. 1, the coupling blank 10, may easily be placed in the machine, it being supported in the recesses in the electrodes. The break 17 in the coupling blank is arranged so as to stand in the vertical plane of the axis of the coupling blank, and open downwardly.

After the coupling blank 10 has been positioned as described, the electrodes 11 and 12 are moved toward each other to engage the exterior surface of the coupling blank, and the clamps 15 and 16 are moved contrarily so as to engage the coupling blank interiorly, and fix the position of the blank in the recessed electrodes.

A slight joint movement of the electrode and clamp at one side of the break, away from the electrode and clamp at the other, is then effected to separate the meeting edges and widen the break 17 in the coupling blank. But both sets of devices may be moved simultaneously for the same purpose. The extent of such separation needs to be but very slight, and only sufficient to permit the insertion in the break of a metal bar 18, preferably with parallel sides (Fig. 4), and conveniently formed by flattening a section of round stock.

The bar 18 has a length equal to that of the edges or surfaces to be welded, and is constituted of any metal having the desired degree of resistance to the passage of the electric current. The cross-sectional formation of the bar 18, will be proportioned to the area of the surfaces to be welded. The said bar 18 is located in central relation with the longitudinal edges or surfaces to be welded, and the two sets of devices clamping the ends of the coupling blank are moved toward each other, to close the break 17 so as to pinch the bar 18, as shown in Fig. 2, and effect a good electrical contact along both of the sides of the bar.

The current, which may be of very low voltage, is then turned on. The resistance imposed by the bar 18 to the passage of the current, rapidly increases the heat in the contiguous regions of the edges or surfaces to be welded, and in a few seconds of time the temperature of the resistance element 18 will reach the melting point of the latter, and the fluid metal resulting will flow out of the break at the meeting ends of the coupling blank. This automatic elimination of the resistance element is followed in the same instant of time by the formation of an electric arc, which jumps the gap at the meeting ends of the blank as the molten metal falls away, and is maintained until it effects a state of fusion in such ends. At the proper moment, the sets of clamping devices are made to approach each other, and the fused edges are brought into abutting contact with the result that the continued pressure effects a perfectly welded union of the parts, as indicated in Fig. 3.

The clamping pressure is then relaxed, and the devices restored to the disengaging positions of Fig. 1. The welded integral coupling 19 may then be withdrawn from the machine. In the operation of welding, it happens that an exaggerated flash 20 is formed interiorly of the coupling at the welding line, and I remove such flash with a pneumatically operated chisel while the metal is still red and soft, thus leaving a wholly smooth surface, and so obviate the necessity for subsequent machining to remove the obstruction formed by the inner flash.

The edges or surfaces to be welded in the production of pipe couplings or other articles have considerable linear extent, and are necessarily of thick metal. The formation of a laterally widened arc extending over the whole of such edges or surfaces at the same instant of time, coupled with the preheating of the edges or surfaces of the parts to be welded which attends the employment of the self-eliminating, resistance element interposed between such edges or surfaces, enables me in a practicable manner to butt-weld heavy plate metal parts presenting elongated welding surfaces, and this result is achieved with an economy in time as well as cost, as compared with methods now known.

Having thus described my invention, what I claim and desire to secure by Letters Patent of the United States, is:

1. The method of electrical welding which comprises the steps of arranging in welding position but separated by an interposed resistance element the parts to be welded, applying an electric current to pre-heat the parts by resistance and melt away the said resistance element and with the elimination of the latter spring an arc across the gap to fuse the parts, and then bringing the fused parts together to complete the welding operation.

2. The method of electrical welding which comprises the steps of arranging in proximity the parts to be welded, inserting a current resistance element between such parts, applying an electric current to pre-heat the parts and melt away the resistance element and with the elimination of the latter springing an arc across the gap to fuse the parts, and then applying pressure to bring the fused parts together to complete the welding operation.

3. The method of electrical welding which comprises the steps of arranging in separated relation the parts to be welded, inserting a conducting element between and contacting with such parts, passing a current through the said element to eliminate it after preheating the parts and springing an arc across the gap between the parts to fuse the latter, and then applying pressure to bring the fused parts together to complete the welding operation.

4. The method of electrical welding which comprises the steps of arranging in proximity parts having elongated edges to be welded, inserting a resistance element of like length but of reduced cross-section between such edges and in contact therewith, passing an electric current through the said edges to pre-heat them and through the resistance element to melt it away and with the elimination of the resistance element springing an arc across the gap to fuse the edges to be welded, and then pressing the fused edges together to complete the welding operation.

5. The method of producing butt welded pipe couplings, which comprises the steps of forming a metal slab into a circular blank with its ends in proximity, applying electrodes to the said blank near the said ends, inserting a resistance element between the said ends and in contact therewtih, applying an electric current to the said ends to pre-heat them and melt away the resistance element and with the elimination of the latter springing an arc across the gap to fuse the said ends, and then moving the electrodes to bring the fused ends together to complete the welding operation.

6. The method of producing butt welded pipe couplings, which comprises the steps of converting a metal slab into a circular blank with its ends in proximity, applying electrodes to the said blank near the said ends, inserting a resistance element between the said ends having the length of the surfaces to be welded, clamping the circular blank upon the electrode, applying an electric current to the said ends to pre-heat them and melt away the resistance element and with the elimination of the latter springing an arc across the gap to fuse the said ends, and then moving the electrodes to bring the fused ends together to complete the welding operation.

In testimony whereof, I have signed my name at Milwaukee, this 10th day of August, 1926.

WARREN F. HEINEMAN.